Aug. 7, 1956  F. A. BIRIBAUER  2,758,071
NAPHTHENIC ACID PURIFICATION PROCESS
Filed March 27, 1953
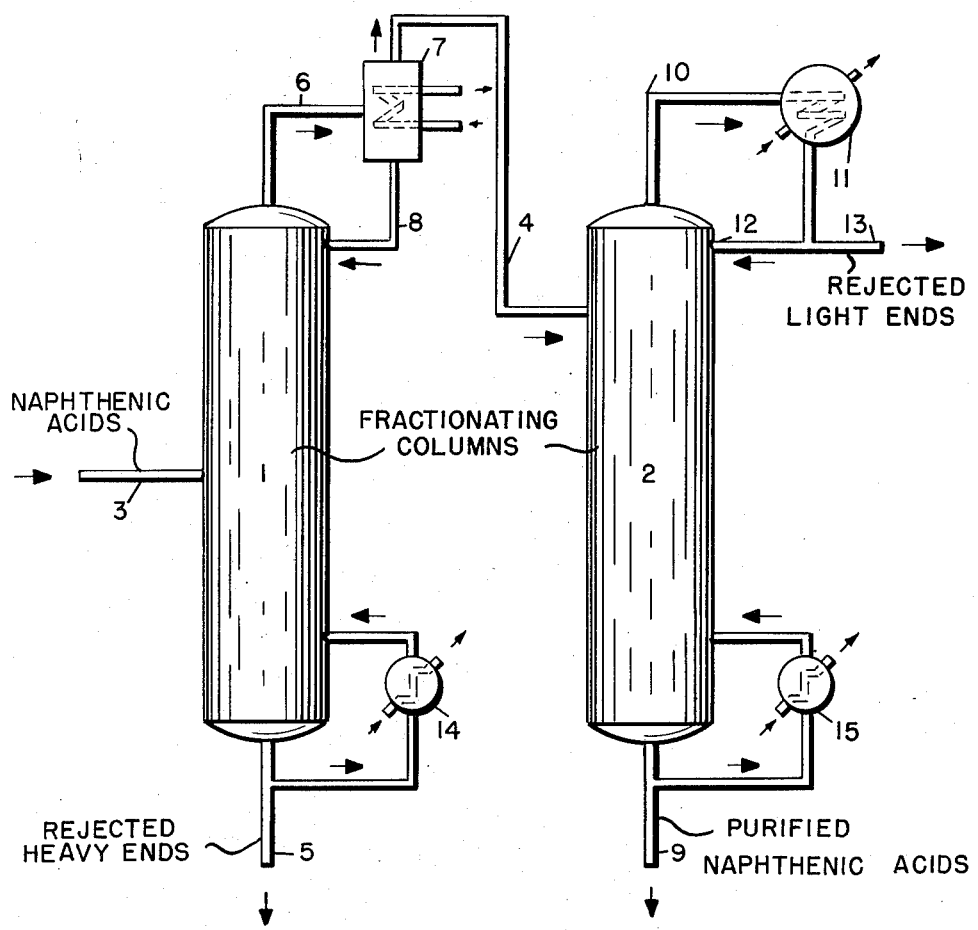
FRANK A. BIRIBAUER  INVENTOR
BY Henry Berk  ATTORNEY 've# 2,758,071

NAPHTHENIC ACID PURIFICATION PROCESS

Frank A. Biribauer, Cranford, N. J., assignor to Esso Research and Engineering Company, a corporation of Delaware Application March 27, 1953, Serial No. 345,003

5 Claims. (Cl. 202—40)

This invention relates to the improved process of distilling chemically treated naphthenic acids in a manner to recover a high quality naphthenic acid product with a minimum of thermal degradation.

The naphthenic acid finishing treatment of the present invention calls for the use of two separately controlled fractional distillation zones. In the first distillation zone, the desired naphthenic acids are distilled overhead with light end impurities while heavy impurities are rejected in the bottoms under conditions of minimum thermal degradation. In the second fractional distillation zone considerably more fractionation is imposed on the overhead product from the first zone to obtain satisfactory elimination of the light end impurities.

Naphthenic acids have found considerable use in industry, particularly as paint driers in the form of metal salts. High grade naphthenic acids have to meet strict requirements on acid number, unsaponifiable matter, color and odor.

The naphthenic acids are generally obtained as extracts in a caustic wash of petroleum fractions, such as gas oils. The usual chemical method of purifying the extracted naphthenic acid treats the caustic solutions with mineral acids, decants the oily naphthenic acids from the aqueous solution, and distills the decanted oil layer containing the naphthenic acid. It has been found that the usual methods of distilling the naphthenic acids with impurities present causes these acids to undergo degradation reactions, such as decarboxylation. Accordingly during the distillation of the naphthenic acids, impurities, such as unsaponifiable matter difficult to separate from the acids, are increased in the acid product unless certain steps now to be described are employed.

The preferred processing scheme of the present invention will be described with reference to the drawing.

As shown in the drawing, a typical crude naphthenic acid stream is fed into an intermediate part of column 1 through line 3. The second fractionation zone is located in column 2 which receives overhead product from column 1 through line 4. High boiling bottoms impurities are withdrawn from column 1 by line 5. The overhead distilled naphthenic acids and light ends from column 1 are passed by line 6 to a cooling condenser 7 which can be controlled to cause partial condensation that forms a small amount of reflux. The reflux of condensed overhead from column 1 is returned from the cooling condenser 7 to an upper part of column 1 by line 8.

An important factor in separating the naphthenic acid from high boilers in column 1 is the use of a low reflux ratio and low residence time in column 1. Therefore, column 1 should be equipped with very few fractionating plates, e. g., up to about 3 theoretical plates, to have a minimum liquid holdup. A relatively low reflux ratio, i. e. a ratio less than 2:1 of reflux to overhead product which is transferred to the next column 2, should be used. Thus, less than 66 volume per cent of overhead distillate is refluxed. At the same time, another important factor is the critical temperature maintained in the bottom part of column 1. Many tests have shown that a satisfactory separation of the naphthenic acids from the higher boiling contaminants is accomplished if the bottoms temperature in column 1 is maintained close to 271° C. but not higher than 271° C., preferably in the range about 260° C. to 271° C.

By controlling the factors of reflux, limited fractionation, and bottoms temperature, little opportunity for thermal degradation is given in this initial fractionation. The subsequent product contamination and yield is closely related to the extent of thermal degradation which occurs during this distillation.

The separation of the light ends impurities from the naphthenic acids in the overhead from column 1 is more difficult to make from a fractionation viewpoint and requires a much higher reflux ratio and longer residence time then can be used in the first column. When the separation between the light ends impurities and the naphthenic acid product is made in column 2, although the residence time is relatively high in column 2, the bottoms or pot temperature can be kept adequately low to minimize thermal degradation of the naphthenic acids. The bottoms temperatures in column 2 are preferably maintained in the range of about 150° to 175° C.

Column 2 receiving the overhead product of column 1 through feed line 4 at an intermediate point is equipped with a bottoms drawoff line 9 and an overhead line 10. The purified naphthenic acids fraction may be withdrawn through the bottom drawoff line 9 or from some bottom portion of column 2. The light ends impurities are taken overhead through line 10 to a cooling condenser 11 where a sufficiently low temperature is maintained to afford a large amount of liquid reflux. Reflux is returned by line 12. For suitable fractionation in column 2 a high reflux ratio of from about 20 to 50 parts reflux to 1 part of rejected light ends is maintained. Thus, more than 95 volume per cent of overhead distillate is refluxed. The rejected light ends are withdrawn through line 13.

An example of preferred operating conditions for the two column system described, as determined from operating data is summarized below.

Column 1:
    Pot temperature≦271° C. (520° F.)
    Pot residence time<1 hour
    Reflux ratio≅1.5/1
    Vacuum=5–20 mm. Hg
    Theoretical plates=1–3 plates
    Overhead temperature≅210° C. (410° F.)

Column 2:
    Pot temperature=165° C. (330° F.)
    Pot residence time≅1 hour
    Reflux ratio=20–50/1
    Vacuum in pot=10–20 mm. Hg
    Theoretical plates=3–10 plates
    Overhead temperature≅95° C. (203° F.)

The pot or bottoms temperature and residence times are important factors with regard to thermal degradation. The other variables, such as reflux ratio, pressure and theoretical plates may be adjusted through a range of values as shown in order to prevent the pot temperatures from exceeding the critical limits and in order to prevent the acids from being exposed to high temperatures for an excessive period of time.

Conventional reboiling means may be provided to heat the bottoms of each column in obtaining the desired pot temperatures, i. e., the temperatures required in the residues at the base of each column. Reboiling means 14 for column 1 and 15 for column 2 are shown. Superheated steam or other seat exchange fluid for obtaining uniform indirect heat exchnge is used in the reboilers.

The theoretical plates fulfill the requirements of establishing equilibrium between vapors rising from the plates and liquid flowing down from the plates.

Laboratory data have shown in many tests that the degradation of the naphthenic acids can be kept practically nil if the acids are heated at temperatures not in excess of 271° C. over periods ranging up to several hours but that there is a considerable loss in acid number if the acids are heated to temperatures not much higher than 271° C. for periods of time even less than an hour.

Commonly used distillation or rectification processes for the refining of crude naphthenic acids even under vacuum as low as 10 mm. Hg absolute result in bottoms temperatures in the range of 290° C.–330° C. At these elevated temperatures, the acid number of the naphthenic acids distilled become lowered within a short time of an hour or less to the extent of 20–30 units, thus adversely affecting the quality and yield of the refined naphthenic acids.

The product quality improvement that results from using the processing technique of the present invention will vary with the crude acid composition and the percentage of rejected material. When typical crude naphthenic acids from Aruba are processed to reject 5–6% as heavy ends and 5–6% as light ends, the following results may be expected.

*Analytical inspections*

|  | Crude | Finished Product |
|---|---|---|
| Acid Number, mg. KOH/gm | 235 | 250 |
| Unsaponifiables, wt. percent | 8.6 | 4.0 |
| Density, 20/4 | 0.98 | 0.98 |
| Viscosity (centistokes): |  |  |
| 20° C | 147.1 | ------ |
| 37.8° C | 47.4 | 61.3 |
| 99° C | 5.3 | 6.1 |
| Gardner Color | >18 | 6 |
| Sulfur, wt. percent | 0.36 | 0.44 |

The discussion of the preferred procedure has indicated that the distillation of the crude acids to produce rectified acids having a low unsaponifiable content and improved color requires rapid removal of the naphthenic acids with low boiling impurities from the high boiling impurities without exceeding a critical temperature followed by selective removal of unsaponifiable low boiling impurities in a subsequent topping operation. This combination of steps effects, also, a decrease in phenol content which is correlated with an improvement in odor and improvement in the usefulness of the naphthenic acids as drying agents, since phenols act as antioxidants and tend to form colored oxidation products. With the two column system described the undesired phenolic impurities are satisfactorily rejected overhead from the second column using a small number of plates therein, e. g., 3–10 plates without having to use more than about 3 plates in the first column.

The invention described is claimed as follows:

1. The process of purifying naphthenic acids by distillation of crude naphthenic acids which comprises distilling naphthenic acids and light ends from the crude acids in an initial fractional distillation zone under vacuum, maintaining bottoms of the crude naphthenic acids in said first zone at a temperature close to 271° C. without substantially exceeding 271° C., continuously passing overhead naphthenic acids and light ends distilled from said first zone to a second fractionation zone, rectifying vapors in said second zone with an increased number of plates and reflux, distilling overhead from said second fractionation zone light end impurities, and withdrawing a bottoms purified naphthenic acid product from said second zone.

2. The process of finishing naphthenic acids by distillation, which comprises distilling desired naphthenic acids and light end impurities from a crude naphthenic acid under vacuum in an initial distillation zone, refluxing less than 66 volume per cent of distillate from said zone, maintaining a bottoms temperature of from 265° C. to 271° C. in said zone, passing remaining distillate from said zone to a second fractionation zone, rectifying vapors in the second zone under vacuum countercurrent to a substantially higher proportion of reflux than used in the initial zone to distill overhead light end impurities, and withdrawing purified naphthenic acids as a bottoms product from the second zone.

3. In separating higher and lower boiling impurities, including unsaponifiables, phenols, and sulfur compounds, the steps which comprise rapidly distilling the naphthenic acids with lower boiling impurities from the higher boiling impurities in an initial distillation zone under vacuum countercurrent to reflux amounting to less than 66 volume per cent of distillate removed overhead from said zone while maintaining a maximum bottoms temperature in the range of 265° to 271° C. in said zone, fractionally distilling lower boiling impurities under vacuum from naphthenic acids of remaining overhead distillate passed from said initial zone into a second distillation zone countercurrent to reflux amounting to more than 95 volume per cent of distillate removed overhead from the second zone, while maintaining a maximum bottoms temperature of about 150° to 175° C. in the second zone, and withdrawing purified naphthenic acids as a bottoms product from the second zone.

4. In the process described by claim 3, fractionating vapors in the initial zone through 1 to 3 theoretical plates and fractionating vapors in the second zone through more than 3 theoretical plates.

5. In the process described by claim 3, withdrawing overhead from the initial distillation zone naphthenic acids and impurities which are in vapor phase at 210° C. under an absolute pressure of 5 to 20 mm. Hg and withdrawing overhead from the second distillation zone impurities which are in vapor phase at 95° C. under an absolute pressure of 10 to 20 mm. Hg.

References Cited in the file of this patent
UNITED STATES PATENTS

| 1,906,033 | Wilson | Apr. 25, 1933 |
| 2,301,285 | Kellogg et al. | Nov. 10, 1942 |
| 2,350,256 | Shiras et al. | May 30, 1944 |
| 2,409,773 | Luten et al. | Oct. 22, 1946 |